(12) United States Patent
Wu

(10) Patent No.: US 8,986,634 B2
(45) Date of Patent: Mar. 24, 2015

(54) METHOD FOR RECOVERING METALS FROM WASTE ALUMINUM CATALYST

(71) Applicant: Ping-Tao Wu, Pingtung (TW)

(72) Inventor: Ping-Tao Wu, Pingtung (TW)

(*) Notice: Subject to any disclaimer, the term of this patent is extended or adjusted under 35 U.S.C. 154(b) by 71 days.

(21) Appl. No.: 13/889,070

(22) Filed: May 7, 2013

(65) Prior Publication Data

US 2014/0286840 A1 Sep. 25, 2014

(30) Foreign Application Priority Data

Mar. 25, 2013 (TW) .............................. 102110513 A

(51) Int. Cl.
*C22B 4/00* (2006.01)
*C22B 3/00* (2006.01)
*C22B 21/00* (2006.01)

(52) U.S. Cl.
CPC ........... *C22B 23/0446* (2013.01); *C22B 21/003* (2013.01)
USPC ............... 423/53; 423/68; 423/131; 423/132; 423/150.2; 423/139; 205/589; 205/591

(58) Field of Classification Search
None
See application file for complete search history.

(56) References Cited

U.S. PATENT DOCUMENTS

| | | | | |
|---|---|---|---|---|
| 3,773,890 | A | * 11/1973 | Fox et al. | ......................... 423/58 |
| 4,087,510 | A | * 5/1978 | Steenken | ......................... 423/53 |
| 4,495,157 | A | 1/1985 | Sebenik et al. | |
| 5,702,500 | A | * 12/1997 | Llanos et al. | ................. 75/10.25 |

FOREIGN PATENT DOCUMENTS

CN 101631598 1/2010

* cited by examiner

*Primary Examiner* — Steven Bos
(74) *Attorney, Agent, or Firm* — Muncy, Geissler, Olds & Lowe, P.C.

(57) ABSTRACT

The present invention refers to a method being easy to recover metals including nickel and aluminum from waste aluminum catalysts, thereby entirely promoting the recovering rate. Said method comprises: preparing and roasting a waste aluminum catalyst with sodium salts, and then obtaining a first solution comprising vanadium and molybdenum, and a dreg comprising nickel and aluminum through leaching and filtrating; collecting and mixing the dreg with alkali powders to obtain a mixture of the dreg and alkali powders, roasting the mixture at 300 to 1000° C. with aluminum in the dreg reacting with hydroxyl generated from the roasting of mixture and further generating aluminum hydroxide, and then obtaining a second solution comprising aluminum and a concentrate having nickel through another leaching and filtrating; and recovering aluminum from the second solution and recovering nickel from the concentrate.

14 Claims, No Drawings

METHOD FOR RECOVERING METALS FROM WASTE ALUMINUM CATALYST

BACKGROUND OF THE INVENTION

1. Field of the Invention

The present invention relates to a method for recovering metals from waste catalysts, particularly to a method for recovering metals including nickel and aluminum from waste aluminum catalysts.

2. Description of the Related Art

In oil-refining industry, catalysts have been widely used in oil-cracking processes, with said catalysts generally have a carrier of alumina oxide ($Al_2O_3$), and with the carrier to immobilize metals in an active state, for example molybdenum or nickel, on surfaces thereof. Basically, those catalysts are aluminum catalysts.

Since said catalysts are easy to be ineffective due to the contamination and absorption of mass iron, phosphorus and vanadium during a catalysis process, a great amount of waste catalysts are generated during the processes of oil-refining, and which may lead to serious pollutions or ecological crisis while said waste catalysts are directly dumped without further processing. However, said waste catalysts are rich in valuable metals, such as vanadium, molybdenum, nickel, and aluminum, which are capable of being recovered and further in used in industries.

Conventional methods for processing waste catalysts include sodium-roasting process, roasting and acid leaching extraction, and alkali leaching extraction, wherein the sodium-roasting process is the most widely used among those methods.

However, nickel and aluminum in the waste catalysts are not easy to separate from the waste catalysts in the sodium-roasting process, since they are covered in sharp spar like dregs while the waste catalysts are sodium-roasted. Thus, the separation of nickel and aluminum from the sharp spar like dregs only can be achieved via processes of alkali leaching at a high pressure, acid leaching at a high pressure, or heating with arc furnace, which are complicated in process and wasteful in cost due to a great consuming of acid solution, alkali solution and energy (for example arc furnace). Accordingly, most industries have no choice but dump those sharp spar like dregs directly, however resulting in waste of resources and environment pollutions.

U.S. Pat. No. 4,495,157 entitled as "RECOVERY OF METAL VALUES FROM SPENT HYDRODESULFURIZATION CATALYSTS" discloses a conventional method using alkali leaching process to extract metals from waste catalysts. However, said alkali leaching process is poor in extraction rate due to a high amount of aluminum in the waste catalysts. Also said alkali leaching process is dangerous and costly since it has to be processed under a high pressure. Therefore, said alkali leaching process has plenty of disadvantages so as to be less useful to industry. Further, Chinese publication Patent No. 101631598 entitled as "METHOD OF RECOVERING VALUABLE METALS FROM THE VRDS SPENT CATALYST" discloses a conventional method of processing waste catalysts through processes, such as deoiling-roasting and oxidized-roasting, with metals being extracted from the waste catalysts respectively by further adjusting a pH value via acid leaching. However, said process of deoiling-roasting is wasteful in energy and cost with lots of acid solution being required as an adjustment of pH value. Moreover, said conventional method is poor in extraction rate of nickel and aluminum.

Hence, there is a pressing need for developing a new strategy, which can improve said disadvantages and effectively recover metal values, such as nickel and aluminum from waste aluminum catalysts.

SUMMARY OF THE INVENTION

The primary objective of this invention is to improve said disadvantages and provide a method for recovering metals from waste aluminum catalysts, so as to easily separate metal values, such as nickel and aluminum, from the waste aluminum catalysts and to promote entirely recovering rate.

The secondary objective of this invention is to provide a method for recovering metals from waste aluminum catalysts, so that it is sufficient to recover metals from the waste aluminum catalysts through a simplified and economic process.

Another objective of this invention is to provide a method for recovering metals from waste aluminum catalysts, which can prevent from generating sharp spar like dregs, so as to be eco-friendly.

The present invention fulfills the above objectives by providing a method for recovering metals from waste aluminum catalysts. The method for recovering metals from waste aluminum catalysts comprises preparing and roasting a waste aluminum catalyst with sodium salts, and then obtaining a first solution and a dreg through leaching and filtrating, wherein the first solution comprises vanadium and molybdenum, and the dreg comprises nickel and aluminum; collecting and mixing the dreg with alkali powders to obtain a mixture of the dreg and the alkali powder, roasting the mixture at 300 to 1000° C. with aluminum in the dreg reacting with hydroxyl generated from the roasting of the mixture and further generating aluminum hydroxide, and then obtaining a second solution and a concentrate through leaching and filtrating, wherein the second solution comprises aluminum and the concentrate comprises nickel; and recovering aluminum and nickel by precipitating aluminum and nickel from the second solution and the concentrate respectively.

In the method for recovering metals from waste aluminum catalysts, a weight ratio between the dreg and alkali powder is 0.1:1 to 1:1, wherein the alkali powder is sodium hydroxide, potassium hydroxide, or sodium carbonate, wherein the dreg and alkali powder are roasted for 1 to 4 hour.

In the method for recovering metals from waste aluminum catalysts, calcium salts are added to the second solution after the second solution has been leached, so as to precipitate and to further filter out vanadium and molybdenum from the second solution to obtain a filtrate, wherein a mineral acid is added to the filtrate with a pH value thereof being adjusted to 7 to 9, so as to precipitate aluminum from the filtrate, with the mineral acid being sulfuric acid, hydrochloric acid, phosphoric acid, perchloric acid, hydrofluoric acid or nitrous acid.

In the method for recovering metals from waste aluminum catalysts, after the concentrate is obtained, the concentrate is leached with a mineral acid to obtain an acid solution, followed by extracting nickel from the acid solution comprising nickel with an extractant and back-extracting nickel with an acid to obtain nickel having an acid group, wherein both of the mineral acid and the acid are sulfuric acid, hydrochloric acid, phosphoric acid, perchloric acid, hydrofluoric acid or nitrous acid.

In the method for recovering metals from waste aluminum catalysts, after the concentrate is obtained, the concentrate is leached with a mineral acid to obtain an acid solution comprising nickel, followed by adding an alkali solution in the acid solution comprising nickel to precipitate a compound having nickel, wherein the mineral acid is sulfuric acid, hydrochloric acid, phosphoric acid, perchloric acid, hydrofluoric acid or nitrous acid.

In the method for recovering metals from waste aluminum catalysts, after the concentrate is obtained, the concentrate is leached with a mineral acid to obtain an acid solution comprising nickel, followed by electrolyzing the acid solution comprising nickel to precipitate nickel, wherein the mineral acid is sulfuric acid, hydrochloric acid, phosphoric acid, perchloric acid, hydrofluoric acid or nitrous acid.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

DETAILED DESCRIPTION OF THE INVENTION

Waste aluminum catalysts as defined in the present invention refers to waste catalysts which lose activity of catalyst through the oil-refining processes, with said waste catalysts having a carrier of alumina oxide and comprising metals including vanadium/cobalt, molybdenum, nickel and aluminum. As an example, said waste catalysts can be RDS waste catalysts, HDS waste catalysts, nickel-cobalt waste catalysts, nickel-tungsten waste catalysts, nickel-molybdenum or nickel-molybdenum-tungsten. Through the present invention, each said waste catalyst can be processed individually or in combination with other waste catalysts. In the following, preferable embodiments of the present invention are further described.

In accordance with a preferable embodiment of the present invention, a method for recovering metals from waste aluminum catalysts comprises a first step, and a second step, with the first step preparing and roasting a waste aluminum catalyst with sodium salts, and then obtaining a first solution and a dreg through leaching and filtrating, wherein the first solution comprises vanadium and molybdenum, and the dreg comprises nickel and aluminum. Preferably, a sodium carbonate ($NaCO_3$), being a weak base, is selected as the sodium salt and used in the roasting, so that it can avoid a coating that usually happens as alkali materials directly contact heavy oil of the waste catalysts during the roasting. Precisely, the roasting with sodium salts is known to one of ordinary skill in the art, for obtaining a leaching solution comprising vanadium and molybdenum, and a dreg comprising nickel and aluminum through leaching. In the present embodiment, the roasting with sodium salts is preferably processed at 800 to 900° C., followed by obtaining the first solution and the dreg through filtrating, and then the dreg is collected to carry out the second step.

On the other hand, the first solution can be further processed to precipitate vanadium and molybdenum from the first solution via ordinary skill in the art. Simply, in the present embodiment, vanadium (in the form of ammonium metavanadate) of the first solution is the primary precipitate by using ammonium chloride, and then molybdenum (in the form of molybdic acid) of the first solution is precipitated by using acid solution, so as to obtain vanadium and molybdenum.

In the first step, most vanadium and molybdenum in the waste catalysts are separated, and which requires ordinary skill in the art and thus precisely processes therein can be further adjustable according to practical situations and will not be further described herein.

In the second step, the dreg obtained from the first step is collected and mixed with alkali powder to obtain a mixture of the dreg and alkali powder, and then oxidized-roasting the mixture of the dreg and alkali powder at 300 to 1000° C., with aluminum therein reacting with hydroxyl generated from the oxidized-roasting and generating aluminum hydroxide. After that, a second solution and a concentrate are obtained through leaching and filtrating, wherein the second solution comprises aluminum and the concentrate comprises nickel. Preferably, a weight ratio between the dreg and alkali powder is 0.1:1 to 1:1, and thus the alkali powder is sufficient to react with the dreg but using excessive dosage of alkali powder and being wasteful in cost.

Specifically, the alkali powder can be alkali compound, such as sodium hydroxide, potassium hydroxide, or sodium carbonate, with hydroxyls either received in the alkali powder or generated from a reaction between water (the dreg still contains rare water) and the alkali powder reacting with aluminum in the dreg to generate aluminum hydroxide. Preferably, in the present embodiment, the hydroxyls are mainly come from sodium hydroxide in the form of powder, and accordingly aluminum of the dreg is sufficient to react with hydroxyls of sodium hydroxide during the oxidized-roasting (general equation of said chemical reaction being listed below), so as to generate aluminum hydroxide. Besides, nickel will not react with sodium hydroxide but remain present in the dreg.

$$NaOH + Al \rightarrow Na^+ + AlOH^- \qquad \text{Equation 1:}$$

In the present embodiment, obtained aluminum hydroxide is preferably further leached with water at 95, followed by obtaining the second solution and the concentrate (namely a dreg having nickel obtained from the filtrating) through filtrating. In order to recover aluminum and nickel, the following processes are carried out on the second solution and the concentrate in the present embodiment.

The second solution obtained from the second step has a great amount of aluminum and rare vanadium and molybdenum. In order to recover pure aluminum, after the second step, calcium salts can be further added into the second solution in the present embodiment, with the calcium salts reacting with the rare vanadium and molybdenum of the second solution and precipitating vanadium and molybdenum, and then a filtrate is obtained after filtering out the precipitated vanadium and molybdenum. After that, a mineral acid is used to adjust a pH value of the filtrate to pH 7 to 9, with aluminum in the filtrate being precipitated through acid leaching, and thus pure aluminum can be successfully recovered. The mineral acid can be sulfuric acid, hydrochloric acid, phosphoric acid, perchloric acid, hydrofluoric acid or nitrous acid.

On the other hand, the concentrate having nickel obtained from the second step has a great amount of nickel and rare aluminum. For the sake of recovering pure nickel, after the second step, the present embodiment can further process following steps as described below.

Step 1:

The step 1 comprises acid leaching the concentrate having nickel with a mineral acid, to obtain an acid solution comprising nickel; extracting nickel (in the form of oil phase) from the acid solution comprising nickel with an extractant; and back-extracting nickel with an acid, to obtain nickel having an acid group. The mineral acid and the acid can be sulfuric acid, hydrochloric acid, phosphoric acid, perchloric acid, hydrofluoric acid or nitrous acid. Preferably, in the present embodiment, sulfuric acid is selected and used as the acid, with sulfuric acid back-extracting nickel to obtain nickel sulfate. In view of the step 1, obtained nickel sulfate can be further processed by a person in the art, in order to obtain products with a high value (for example, obtaining nickel oxide through roasting).

Step 2:

The step 2 comprises acid leaching the concentrate having nickel with a mineral acid, to obtain an acid solution comprising nickel, then adding an alkali solution in the acid solution comprising nickel to precipitate a compound having nickel, wherein the alkali solution can be sodium hydroxide, potassium hydroxide, or sodium carbonate.

Step 3:

The step 3 comprises acid leaching the concentrate having nickel with a mineral acid, to obtain an acid solution comprising nickel, and then electrolyzing the acid solution comprising nickel to precipitate nickel, wherein parameters of the electrolyzing are adjustable in accordance with practical operating systems to a person in the art and which will not be limited herein.

In summary, through the present invention, it can not only remove the majority of vanadium and molybdenum from the waste catalysts through the roasting with sodium salts and the leaching, but also avoid the coating while the roasting. Accordingly, the alkali powder and the aluminum of the dreg are sufficient to react with each other completely, conducting oxidization and generating aluminum hydroxide during the roasting. Also, since nickel in the dreg will not react with the alkali powder, it is easy to obtain and isolate the second solution and the concentrate through leaching. With these, aluminum and nickel in the waste catalysts are easy to precipitate and to recover in the following processes, so that total recovering rates of metals are dramatically increased. Additionally, through the oxidized-roasting of the present invention, it is capable of preventing from the generating of sharp spar like dregs during the sodium-roasting of the waste catalysts, reducing pollutions and contamination, and successfully recovering metal values from the waste catalysts. Therefore, with the present invention, the processing of the waste catalysts is achieved in a simplified and costless way, and which can be widely utilized.

For proving said advantages of the present invention, such as effectively recovering nickel and aluminum respectively and increasing entirely recovering rate, various examples are performed, with the alkali powder being sodium hydroxide to providing hydroxyls and with waste catalysts being waste RDS catalysts and HDS catalysts.

Example 1

In the example 1, 1000 grams of waste RDS catalysts having 22.4 wt % aluminum, 3.2 wt % molybdenum, 2 wt % nickel and 7.6 wt % vanadium therein are prepared and roasted with sodium salts, to obtain 450 grams of dregs, with the dregs comprising 45 wt % aluminum, 0.5 wt % molybdenum, 4 wt % nickel and 0.8 wt % vanadium. The dregs are further processed through various processes, and then the leaching rate of each metal in the dregs is demonstrated and recorded in TABLE 1, 2, and 3 individually.

In TABLE 1, the dregs is further mixed with sodium hydroxide in a weight ratio (dregs:sodium hydroxide) of 1:0.1, 1:0.3, 1:0.6 and 1:1, and reacted with each other at 600° C. for 2 hours, followed by analyzing metals of the dregs.

TABLE 1

Leaching Rates of Metals under Various Weight Ratio

| Leaching Rates (%) | Dregs:sodium hydroxide | | | |
|---|---|---|---|---|
| | 1:0.1 | 1:0.3 | 1:0.6 | 1:1 |
| Aluminum | 20 | 70 | 92 | 95 |
| Molybdenum | 92 | 96 | 98 | 99 |
| Vanadium | 94 | 96 | 99 | 99 |
| Nickel | N.D | N.D | N.D | 0.6 |

It is shown that, impurities (except nickel) can be removed dramatically, as well as metals (except nickel), including aluminum, molybdenum, and vanadium, are leached, as the weight ratio of hydroxide is increased. Specifically, the leaching rates of aluminum, molybdenum, and vanadium reach 92%, with only nickel being remained in the dreg.

In TABLE 2, the dregs is further mixed with sodium hydroxide in a weight ratio (dregs:sodium hydroxide) of 1:0.6, and reacted with each other at a temperature ranged from 300° C. to 600° C. for 2 hours, followed by analyzing metals of the dregs.

TABLE 2

Leaching Rates of Metals under Various Reacting Temperatures

| Leaching Rates (%) | Temperature (° C.) | | | |
|---|---|---|---|---|
| | 300 | 400 | 600 | 1000 |
| Aluminum | 70 | 85 | 92 | 95 |
| Molybdenum | 98 | 98 | 99 | 99 |
| Vanadium | 99 | 99 | 99 | 99 |
| Nickel | N.D | N.D | N.D | N.D |

It is noted that almost no nickel has been leached even reacting at 1000° C. Beside, other metals, such as aluminum, vanadium, and molybdenum are completely leached, with no remaining aluminum, vanadium, and molybdenum in the dregs.

In TABLE 3, the dregs is further mixed with sodium hydroxide in a weight ratio (dregs:sodium hydroxide) of 1:0.6, and reacted with each other at 600° C. for 2 to 4 hours, followed by analyzing metals of the dregs.

TABLE 3

Leaching Rates of Metals under Various Reacting Times

| Leaching Rates (%) | Reacting times (hr) | | | |
|---|---|---|---|---|
| | 1 | 2 | 3 | 4 |
| Aluminum | 80 | 92 | 95 | 97 |
| Molybdenum | 98 | 98 | 99 | 99 |
| Vanadium | 99 | 99 | 99 | 99 |
| Nickel | N.D | N.D | N.D | N.D |

According to TABLE 3, it is shown that, no matter how long the dregs and the sodium hydroxide has reacted, it is difficult to leach nickel from the dregs. On the other hand, the leaching rates of aluminum, vanadium and molybdenum are increased by reacting times, with leaching rates of aluminum, vanadium and molybdenum reaching 90% as reacting for more than 2 hours.

In the following, another waste catalyst is chosen and processed via the method of the present invention, with analyzing data being available in TABLEs 4 and 5.

Example 2

In the example 2, 1000 grams of waste HDS catalysts having 27.3 wt % aluminum, 11.5 wt % molybdenum, 1 wt % nickel and 2.4 wt % cobalt therein are prepared and roasted with sodium salts, to obtain dregs. The dregs are mixed with sodium hydroxide in a weight ratio of 1:0.6 and reacted with each other at 600° C. for 2 hours, followed by analyzing metals of the dregs. After that leaching rate of each metal in the dregs is analyzed and recorded in TABLE 4.

TABLE 4

| Leaching Rate of each metal | | | |
|---|---|---|---|
| | Rounds | | |
| Leaching Rates (%) | S1 | S2 | S3 |
| Aluminum | 95 | 94 | 95 |
| Molybdenum | 98 | 98 | 99 |
| Vanadium | N.D | N.D | N.D |
| Nickel | N.D | N.D | N.D |

It is indicated that the leaching rates of aluminum, molybdenum, and vanadium also reach to more than 90% and the leaching rates of cobalt and nickel are nearly nil while the waste HDS catalysts has been processed according to similar conditions as the waste RDS catalysts. Also, with data of S1 to S3, it is believed that analyzed data in TABLE 4 are reproducible.

Example 3

In the example 3, 1000 grams of waste HDS catalysts having 33.3 wt % aluminum, 4.1 wt % molybdenum, 2.5 wt % nickel and 1 wt % cobalt therein are prepared, mixed with waste RDS catalysts and roasted with sodium salts, to obtain dregs. The dregs are mixed with sodium hydroxide in a weight ratio of 1:0.6 and reacted with the sodium hydroxide at 600° C. for 2 hours, followed by analyzing metals of the dregs. After that leaching rate of each metal in the dregs is analyzed and recorded in TABLE 5.

TABLE 5

| Leaching Rate of each metal | | | |
|---|---|---|---|
| | Rounds | | |
| Leaching Rates (%) | S1 | S2 | S3 |
| Aluminum | 96 | 94 | 95 |
| Molybdenum | 98 | 98 | 99 |
| Vanadium | 97 | 98 | 98 |
| Cobalt | N.D | N.D | N.D |
| Nickel | N.D | N.D | N.D |

It is indicated that the leaching rates of aluminum, molybdenum, and vanadium also reach to more than 90% and the leaching rates of cobalt and nickel is nearly nil while the waste HDS catalysts and the RDS catalysts have been processed according to similar conditions than the waste RDS catalysts and the waste HDS catalysts. Also, with such data of S1 to S3, it is believed that analyzed data in TABLE 5 are reproducible.

Moreover, total recovering rates of aluminum, molybdenum, nickel, vanadium and cobalt according to TABLEs 3 and 4 are further calculated and recorded below.

TABLE 6

| Total Recovering Rate of Each Metal | | | | | |
|---|---|---|---|---|---|
| | Metals | | | | |
| | Aluminum | Molybdenum | Nickel | Vanadium | Cobalt |
| Total Recovering Rate (%) | 90 | 80 | 93 | 80 | 91 |

It is believed that, aluminum, molybdenum, nickel, vanadium and cobalt can be effectively recovered from the dregs, particular, in an increased total recovering rate.

Accordingly, through the method for recovering metals from waste aluminum catalysts of the present invention, it is easy to separate metal values, such as aluminum and nickel, from the waste aluminum catalysts, and to recover said metal values, thereby increasing the total recovering rates of said metal values. Otherwise, the present invention is capable of preventing the generation of sharp spar like dregs during the sodium-roasting of the waste catalysts, reducing pollutions and contamination, and successfully recovering metal values from the waste catalysts. Therefore, with the present invention, the processing of the waste catalysts can be achieved in a simplified and costless way, and which can be widely utilized in industries.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for recovering metals from waste aluminum catalysts, comprising:
    roasting a waste aluminum catalyst with sodium salts, leaching the roasted waste aluminum catalyst, and then filtering the leached waste aluminum catalyst to obtain a first solution and a dreg, wherein the first solution comprises vanadium and molybdenum, and the dreg comprises nickel and aluminum;
    collecting and mixing the dreg with alkali powder to obtain a mixture of the dreg and the alkali powder, roasting the mixture at 300 to 1000° C. with aluminum in the dreg reacting with hydroxyl generated from the roasting of the mixture and further generating aluminum hydroxide, leaching the roasted mixture, and then filtering the leached mixture to obtain a second solution comprising aluminum and a concentrate comprising nickel; and
    recovering aluminum and nickel by precipitating aluminum and nickel from the second solution and the concentrate respectively.

2. The method for recovering metals from waste aluminum catalysts as claimed in claim 1, wherein a weight ratio between the dreg and the alkali powder is 0.1:1 to 1:1.

3. The method for recovering metals from waste aluminum catalysts as claimed in claim 1, wherein the alkali powder is sodium hydroxide, potassium hydroxide, or sodium carbonate.

4. The method for recovering metals from waste aluminum catalysts as claimed in claim 1, wherein the mixture of the dreg and the alkali powder is roasted for 1 to 4 hours.

5. The method for recovering metals from waste aluminum catalysts as claimed in claim 1, wherein the second solution further comprises vanadium and molybdenum, and calcium salts are added to the second solution after obtaining the second solution by leaching, so as to precipitate and to further filter out vanadium and molybdenum from the second solution to obtain a filtrate.

6. The method for recovering metals from waste aluminum catalysts as claimed in claim 5, wherein a mineral acid is added to the filtrate to adjust the pH thereof to 7-9, so as to precipitate aluminum from the filtrate.

7. The method for recovering metals from waste aluminum catalysts as claimed in claim 6, wherein the mineral acid is sulfuric acid, hydrochloric acid, phosphoric acid, perchloric acid, hydrofluoric acid or nitrous acid.

8. The method for recovering metals from waste aluminum catalysts as claimed in claim 1, wherein, after the concentrate is obtained, the concentrate is leached by a mineral acid to obtain an acid solution comprising nickel, followed by extracting nickel from the acid solution comprising nickel with an extractant and back-extracting nickel with an acid to obtain nickel having an acid group.

9. The method for recovering metals from waste aluminum catalysts as claimed in claim 8, wherein both the mineral acid and the acid are sulfuric acid, hydrochloric acid, phosphoric acid, perchloric acid, hydrofluoric acid or nitrous acid.

10. The method for recovering metals from waste aluminum catalysts as claimed in claim 1, wherein after the concentrate is obtained, the concentrate is leached by a mineral acid to obtain an acid solution comprising nickel, followed by adding an alkali solution to the acid solution comprising nickel to precipitate a nickel compound.

11. The method for recovering metals from waste aluminum catalysts as claimed in claim 10, wherein the mineral acid is sulfuric acid, hydrochloric acid, phosphoric acid, perchloric acid, hydrofluoric acid or nitrous acid.

12. The method for recovering metals from waste aluminum catalysts as claimed in claim 10, wherein the alkali solution is sodium hydroxide, potassium hydroxide, sodium chloride, or sodium carbonate.

13. The method for recovering metals from waste aluminum catalysts as claimed in claim 1, wherein after the concentrate is obtained, the concentrate is leached by a mineral acid to obtain an acid solution comprising nickel, and then electrolyzing the acid solution comprising nickel to precipitate nickel.

14. The method for recovering metals from waste aluminum catalysts as claimed in claim 13, wherein the mineral acid is sulfuric acid, hydrochloric acid phosphoric acid, perchloric acid, hydrofluoric acid or nitrous acid.

* * * * *